US006683628B1

(12) United States Patent
Nakagawa et al.

(10) Patent No.: US 6,683,628 B1
(45) Date of Patent: Jan. 27, 2004

(54) HUMAN INTERACTIVE TYPE DISPLAY SYSTEM

(75) Inventors: Masaki Nakagawa, Fuchu (JP); Tsuyoshi Oguni, Suginami-ku (JP)

(73) Assignee: Tokyo University of Agriculture and Technology, Tokyo (JP)

( * ) Notice: Subject to any disclaimer, the term of this patent is extended or adjusted under 35 U.S.C. 154(b) by 0 days.

(21) Appl. No.: 09/568,982

(22) Filed: May 11, 2000

Related U.S. Application Data

(62) Division of application No. 08/891,102, filed on Jul. 10, 1997, now Pat. No. 6,128,014.

(30) Foreign Application Priority Data

Jan. 10, 1997 (JP) .................................................. 9-2630

(51) Int. Cl.[7] .............................................. G09G 5/00
(52) U.S. Cl. ...................... 345/799; 345/680; 345/672
(58) Field of Search ................................ 345/438, 121, 345/123, 173, 676, 672, 682, 684, 784, 786, 781, 798, 799, 680

(56) References Cited

U.S. PATENT DOCUMENTS 5,166,666 A * 11/1992 Tanaka ........................ 345/173
5,864,330 A * 1/1999 Haynes ........................ 345/123

FOREIGN PATENT DOCUMENTS

| JP | 6149531  | 5/1994  |
| JP | 07319899 | 12/1995 |
| JP | 08115157 | 5/1996  |
| JP | 08286882 | 11/1996 |

OTHER PUBLICATIONS

Japanese Patent Office Search Report dated Aug. 22, 2000.
M. Nakagawa, et al., "Interactive Dynamic Whiteboard for Educational Applications", Proceedings of International Conference on Virtual Systems and Multimedia; VSMM '96 in Gifu; Sep. 18–20, 1996, Nagaragawa Convention Center; pp. 479–484.
Elrod et al., "Liveboard: A Large Interactive Display Supporting Group Meetings, Presentations and Remote Collaboration," CHI '92 Conference Proceedings, May 1992, ACM, pp. 599–607.
Pedersen et al., "An Electronic Whiteboard for Informal Workgroup Meetings," INTERCHI '93, Conference Proceedings, Apr. 1993, ACM, pp. 391–398.

* cited by examiner

Primary Examiner—Kent Chang
(74) Attorney, Agent, or Firm—Stevens, Davis, Miller & Mosher, LLP

(57) ABSTRACT

A human interactive type dynamic display system including an electronic whiteboard, a pen-like member for marking a point on the whiteboard, and a computer for controlling an image displayed on the whiteboard. On the whiteboard, there is defined an operation region such as a scroll operation region extending along a periphery of the whiteboard. When a user points any point within the scroll operation region with the aid of the pen-like member as a start point, an enable signal for initiating the scroll operation is produced. Then, the displayed image is scrolled in a direction by a distance which are derived by processing a direction and an amount of a dragging operation of the pen-like member on the whiteboard from the start point. Not only the scroll operation, page up and down operation, window shift operation and count value changing operation can be performed in a similar manner.

9 Claims, 10 Drawing Sheets

FIG_1
PRIOR ART
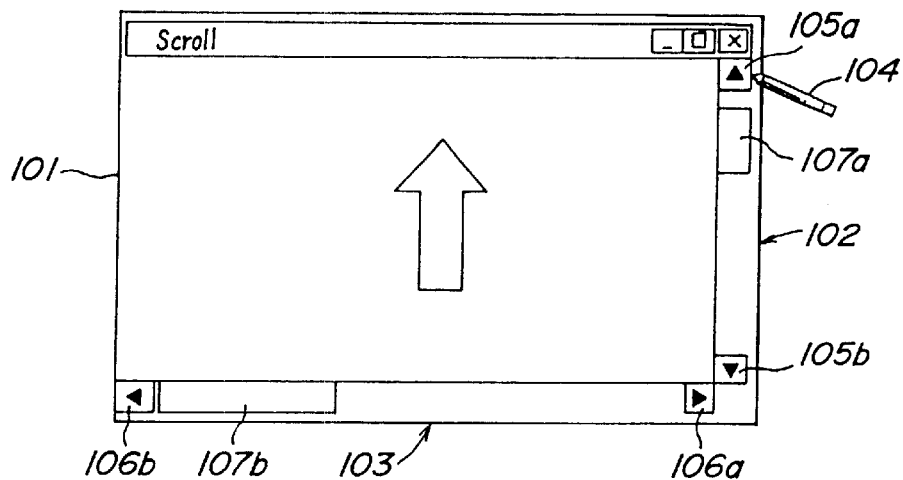
FIG_2
PRIOR ART
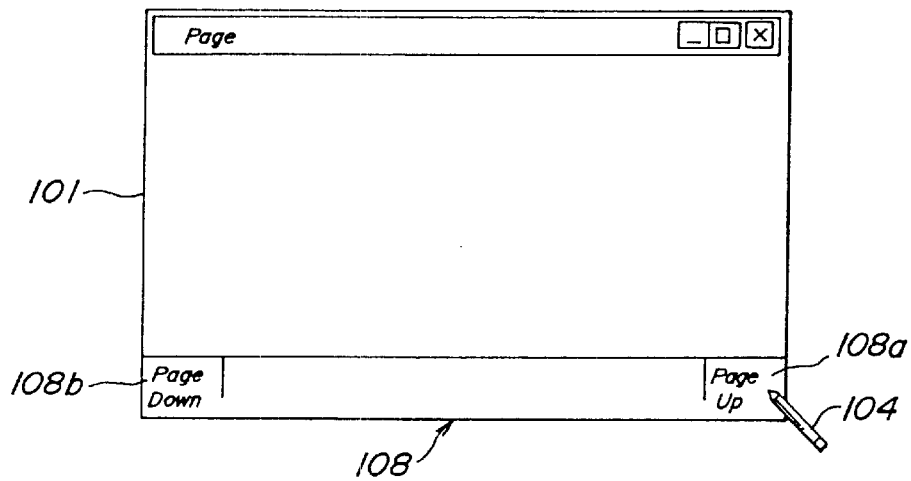
FIG_3
PRIOR ART
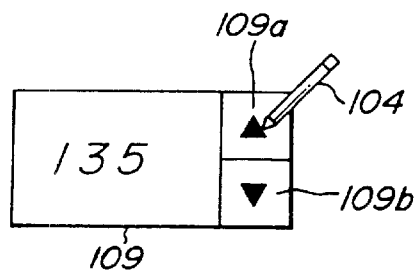

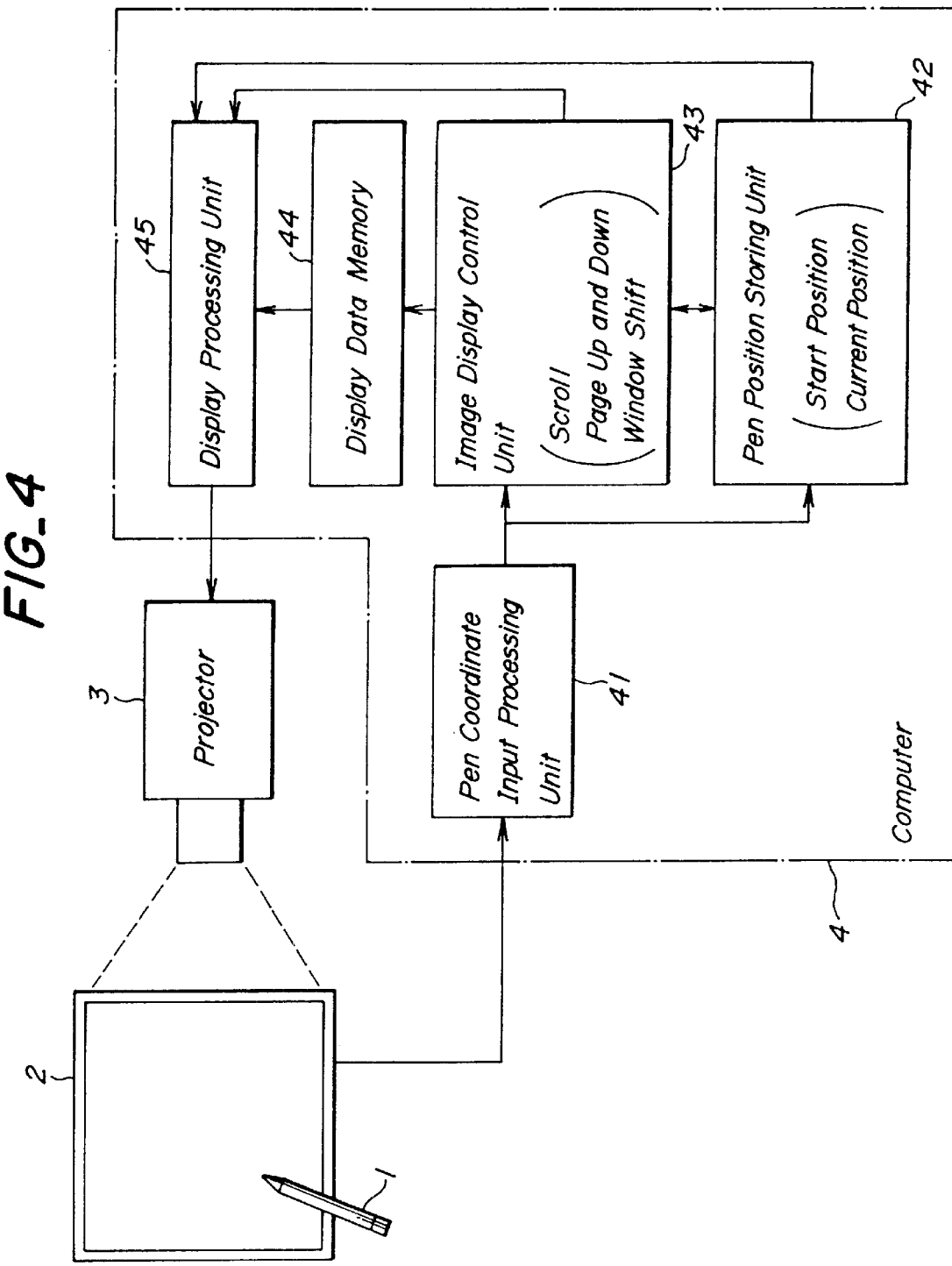

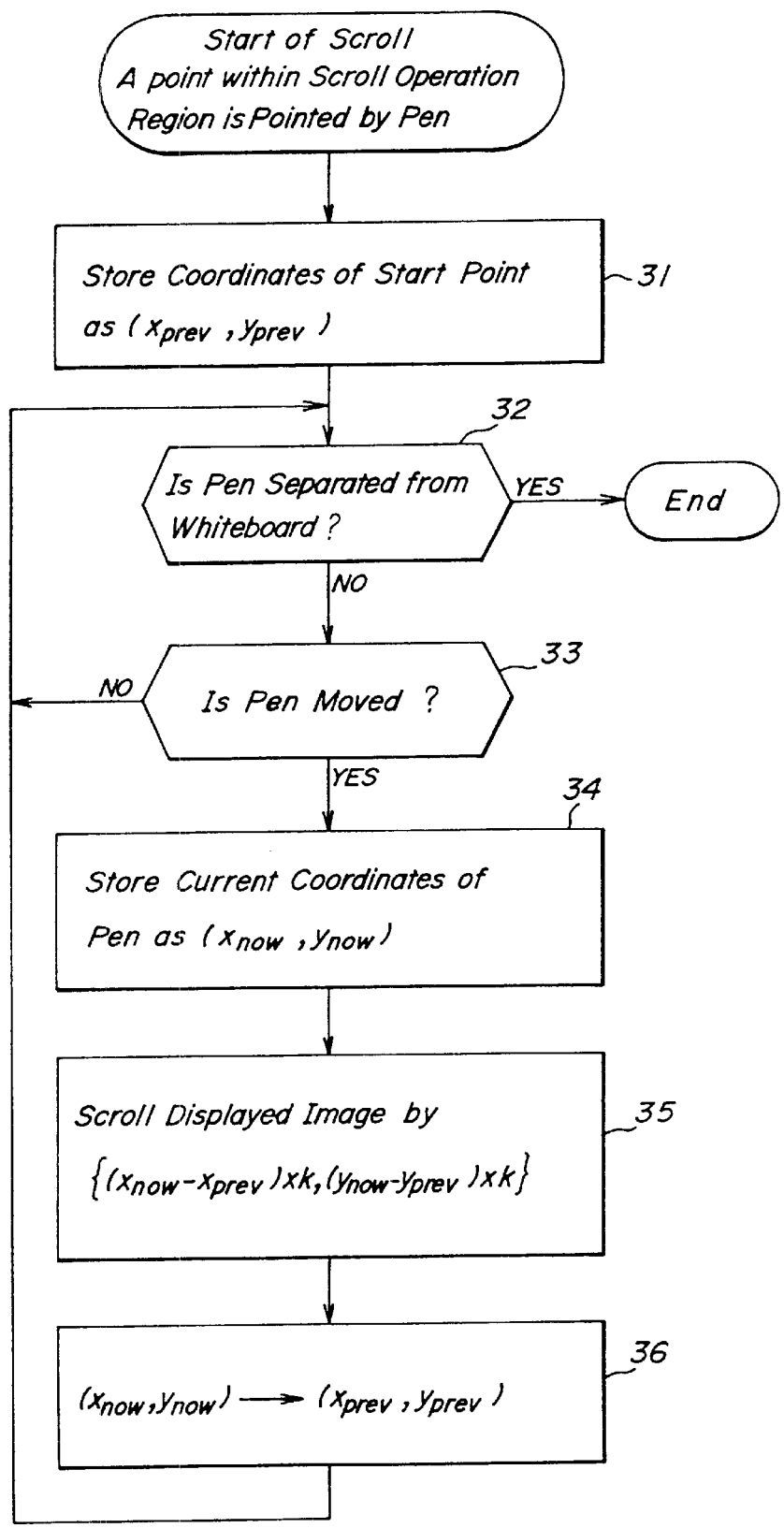
FIG_6

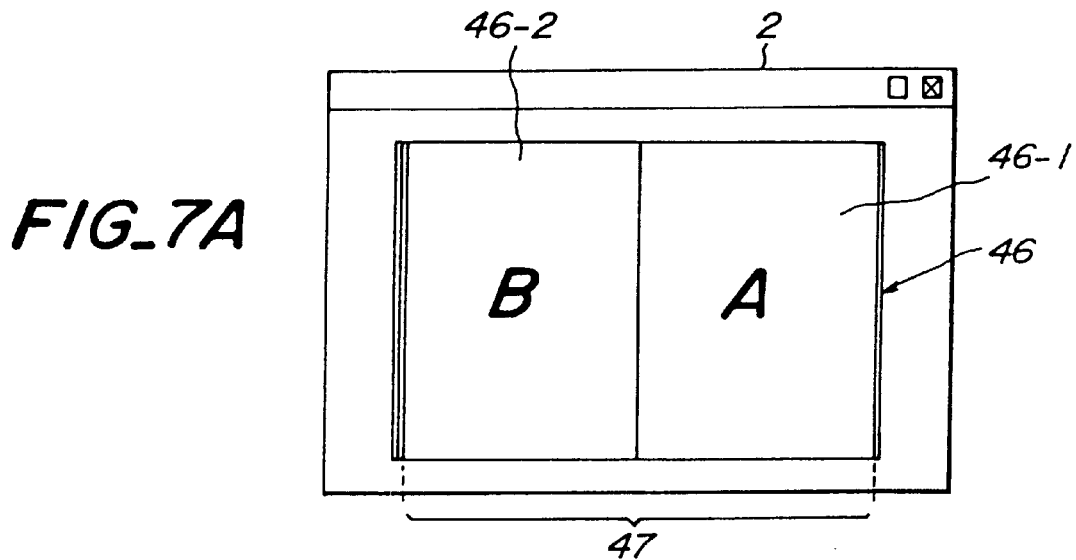
FIG_7A
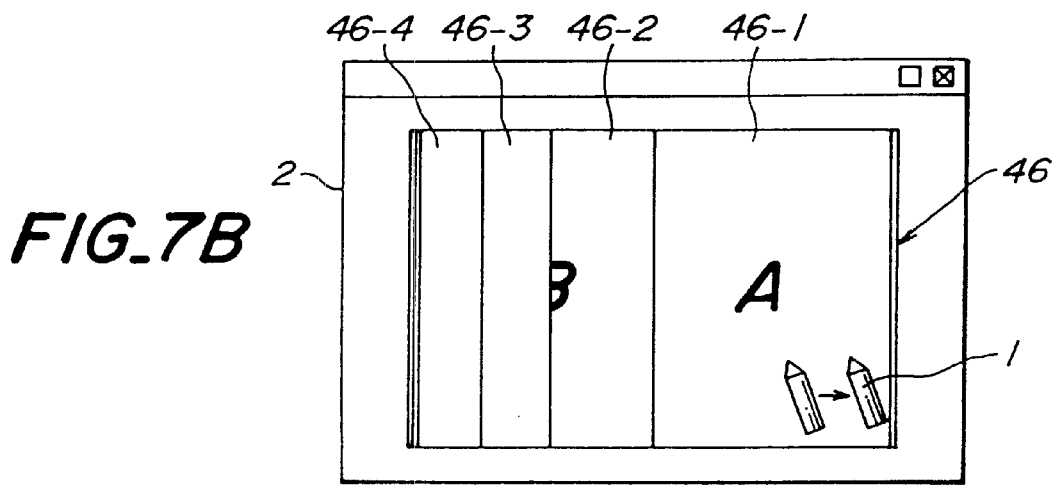
FIG_7B
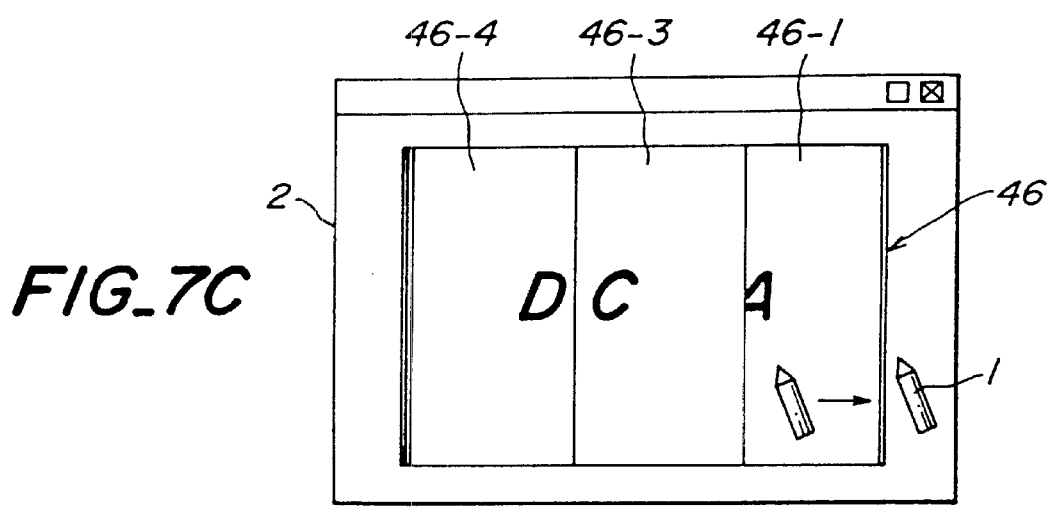
FIG_7C

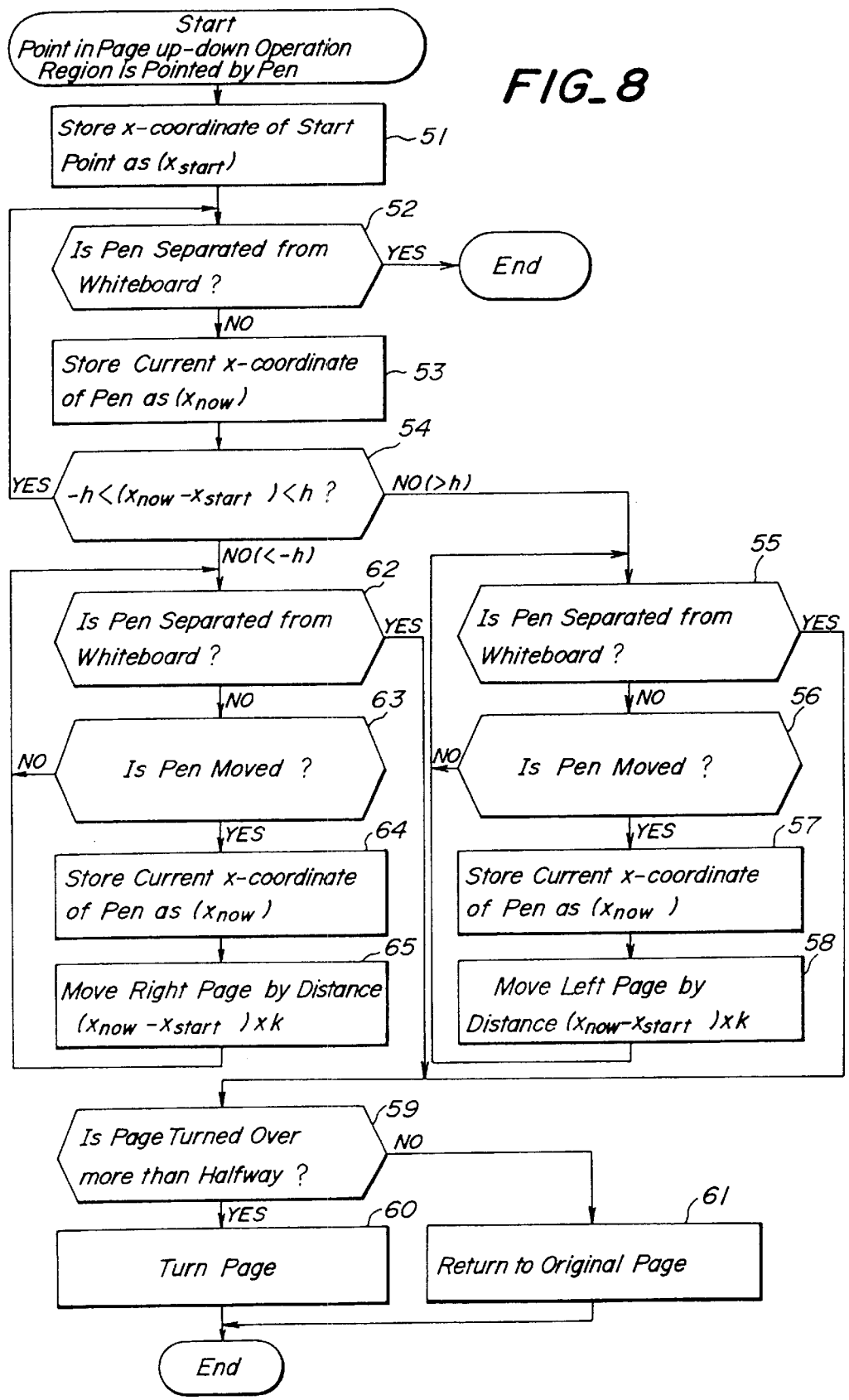
FIG_8

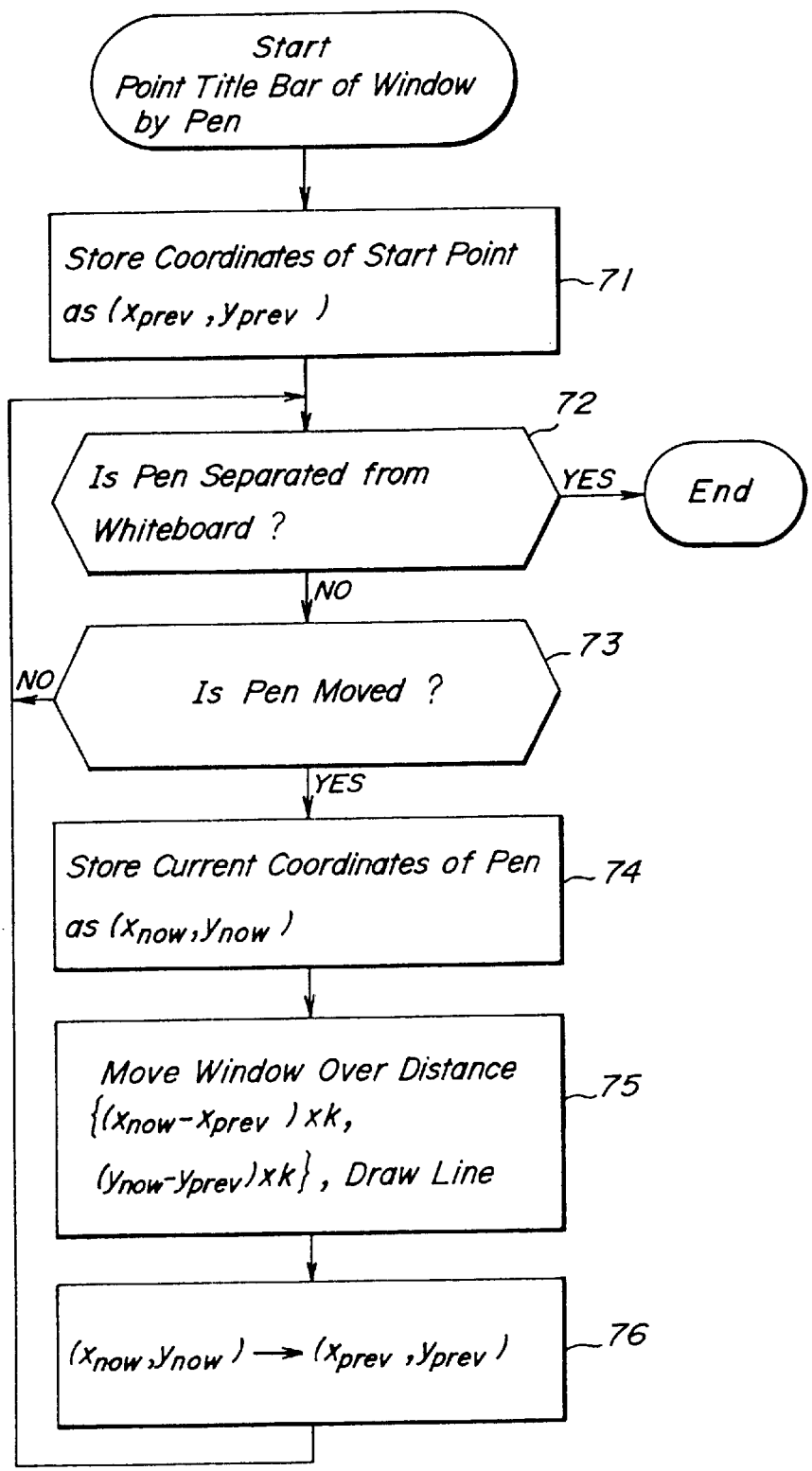

FIG_11
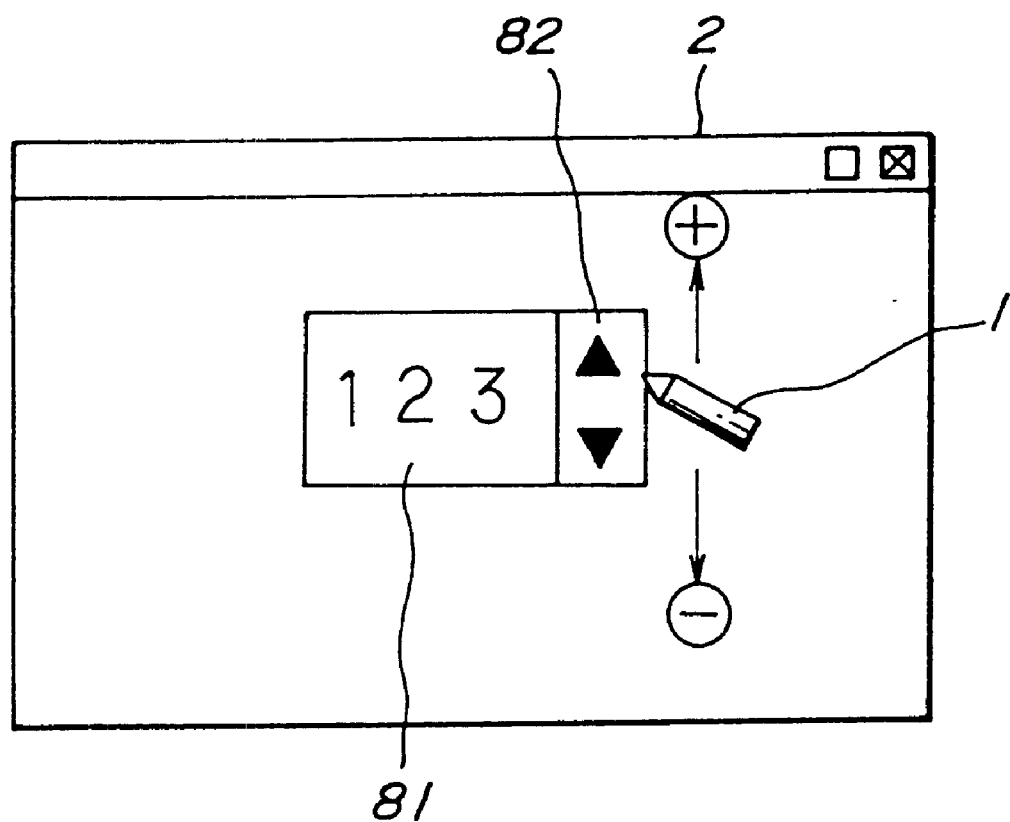

HUMAN INTERACTIVE TYPE DISPLAY SYSTEM

This is a division of application Ser. No. 08/891,102 filed Jul. 10, 1997, now U.S. Pat. No. 6,128,014.

BACKGROUND OF THE INVENTION

1. Field of the Invention

The present invention relates to a human interactive type display system comprising a display means having a display panel on which an image is displayed, a marking means for pointing a point on said display panel, and a controlling means for detecting coordinates of the point on the display panel pointed by said marking means and controlling the image displayed on the display panel in accordance with the detected coordinates of the point pointed by the marking means.

2. Related Art Statement

In universities, colleges and laboratories, there conventional blackboard and whiteboards have been used as a medium for communicating information between a teacher and students or a presenter and attendants or participants. Typically in a university room, teachers use a blackboard or whiteboard for lectures. However, the blackboard or whiteboard could not satisfactorily communicate information between the teacher and students. In a modern computer room, each student uses his own personal computers. Therefore, the possibility of misreading and miscopying information can be reduced. However, there is a concern that some students would focus their attention on their personal computers and would not pay attention to a teacher's explanations.

In order to solve the above mentioned problem, there have been proposed a human interactive type display system comprising a display panel displaying an image thereon, a pen-like member pointing or marking a point on the image displayed on the display panel, a means for detecting a contact condition of the pen-like member to the display panel and coordinates of a contact point, and a means for controlling the image displayed on the display panel in accordance with the detected contact condition and coordinates. Such a human interactive type display system is sometimes called a human interactive type electronic whiteboard, and is described in, for instance, Japanese Patent Application Laid-open Publication Kokai Hei 6-149531; Elrod et al, "Liveboard: A large interactive display supporting group meetings, presentations and remote collaboration", CHI'92, Conference Proceedings, May 1992; and Perdson et al, "An electronic whiteboard for informal workgroup meetings", INTERCHI'93, Conference Proceedings, April 1993, ACM, 391–398. In these known human interactive type dynamic display systems, the control of a displayed content is carried out by GUIs (graphical user interface) which are basically identical with the conventional GUIs used in a usual desktop type display system.

FIG. 1 shows an image displayed on the display panel of a known electronic whiteboard system, in which the displayed image on the whiteboard 101 is moved or scrolled up and down as well as right and left. On a display panel of the whiteboard 101, there are displayed tool bars 102 and 103 for effecting the up and down scroll as well as the right and left scroll. For instance, when a user wishes to scroll the displayed image upward, the user has to handle a pen-like member or electronic chalk 104 such that an upward scroll arrow 105*a* in the up and down scroll tool bar 102 displayed along a right-hand side of the whiteboard 101 is continuously pointed by the pen-like member. As long as the user points the up scroll arrow 105*a*, the displayed image is continuously scrolled upward. Similarly, when the use points at a downward scroll arrow 105*b* by the pen-like member 104, the displayed image is scrolled continuously in the downward direction.

Further, when rightward or leftward scroll arrows 106*a* or 106*b* in the tool bar 103 displayed along a bottom side of the whiteboard 101 is pointed at by the pen-like member 104, the image displayed on the display panel is scrolled in the right-hand or left-hand direction, respectively. In this scroll system, it is also possible to scroll the displayed image up and down or right and left by pointing a scroll button 107*a* or 107*b* in the tool bar 102 or 103 by means of the pen-like member 104 and dragging the pen-like member up and down or right and left. This type of GUI is substantially identical with that for the conventional desktop type personal computer.

FIG. 2 is a schematic view of an image displayed on the display panel 101 of the known electronic whiteboard system, in which the page up and page down functionality is effected. If the user wishes to effect the page up or page down, a page up region 108*a* or a page down region 108*b* is indicated by the pen-like member 104, said page up region and page down region being provided in a page up and down tool bar 108 which is displayed along a bottom side of the display panel 101.

In the manner explained above, in the known human interactive type electronic whiteboard, since the scroll bars 102 and 103 are provided at predetermined portions of the whiteboard 101, a part of the displayed image might be hidden by the user from people who are watching the whiteboard 101. When the electronic whiteboard with a large size is used in a relatively large lecture room of a university, some of students can not see the displayed image sufficiently such that students can not fully or clearly understand the contents of the displayed information. Further, when the scroll is performed by dragging the scroll button 107*a* or 107*b*, it is necessary to move the pen-like member 104 over a relatively long distance, i.e. from top to bottom or from left edge to right edge. For instance, when the displayed image is to be moved rightward from the condition illustrated in FIG. 1, it is necessary to drag the button 107*b* rightward up to the rightward arrow mark 106*a*. To this end, the user has to walk from the left hand end to the right hand end of the whiteboard. During this movement of the user, the displayed information is partly hidden by the user. This is also applied to the page up and down operation, because the page up region 108*a* and page down region 108*b* are provided at both ends of the bottom side of the whiteboard 101.

In the above mentioned Japanese Kokai Hei 6-149,531, there is described another known human interactive type electronic whiteboard system, in which the scroll may be carried out by dragging the pen-like member 104 on the display panel of the whiteboard 101. However, in such a system, when it is required to scroll the displayed image over a long distance, it is necessary to move the pen-like member over a very long distance on the display panel. It is apparent that such an operation requires a large movement of the user or user's hand, and thus an amount of the displayed information hidden by the user becomes correspondingly large. Furthermore, on the electronic whiteboard, not only the text date stored in a memory is displayed, but also a graphical figure drawn by means of the pen-like member 104 is displayed. During this drawing operation, the scroll operation could not be performed, because the movement of the pen-like member 104 for the scroll could not be delineated from that for the drawing. Therefore, in such a case, before effecting the scroll, the draw mode has to be finished. Then, the operation of the user becomes very cumbersome.

In addition to the above scroll and page up and down functionalities, in the known electronic whiteboard system, there is also provided a functionality for incrementing or decrementing numerical data displayed in a counter 109 on the whiteboard 101 as illustrated in FIG. 3. On a right-hand side of the counter 109, there are displayed incrementing button 109a and decrementing button 109b. When the incrementing button 109a is pointed continuously or repeatedly by the pen-like member 104, the count value is increased one by one.

In the known electronic whiteboard system, since the count value incrementing or decrementing button 109a or 109b has to be continuously or repeatedly pointed by the pen-like member 104, a part of the displayed information might be continuously hidden by the user during this operation. Further, such an operation of the user is rather difficult.

Moreover, in the known electronic whiteboard system, a window displayed at a certain area on the display panel is moved or shifted into another area on the display panel. To this end, at first, an arrow mark displayed in a window shift tool bar is pointed by the pen-like member, and then the pen-like member is dragged on the display panel into a desired point. In this system, if the window is moved over a long distance, the user or user's hand has to be moved over a long distance correspondingly. Therefore, an amount of the displayed information hidden by the user becomes correspondingly large and the operation of the user becomes cumbersome.

In order to mitigate the above mentioned drawbacks, it has been further proposed to use the so-called gesture interactive technique. The term "gesture" means a meta-stroke, i.e. a stroke that is not taken to be an element of the drawing, but is to be interpreted as a command. However, such a gesture technique has several problems as follows:
(1) Design of the gestures is very difficult and the gestures are often difficult to remember and easy to forget.
(2) The gestures have simple shapes, and thus could hardly be recognized by machines.
(3) There is little context to argument gestures recognition.
(4) Mode change for inputting the gestures is troublesome and easy to forget.

Due to the above problems, users fear that the gestures might be misinterpreted and may hesitate to use the gestures.

SUMMARY OF THE INVENTION

Therefore, the present invention has for its object to provide a novel and useful human interactive type display system, in which the above mentioned demerits of the known systems could be mitigated and desired functionalities can be performed with a minimum amount of displayed information hidden by a user, while a necessary movement of the user and user's hand can be minimized.

According to the invention, a human interactive type display system comprises:
   a display means having a display panel on which an image is displayed, said display panel having a predetermined operation region;
   a marking means for pointing a point on said display panel; and
   a controlling means for detecting a marking operation of a user by said marking means for a point within said operation region in the display panel to produce an enable signal and coordinates of points on the display panel pointed by said marking means successively from said point within the operation region to produce a position signal during a marking operation of the user, processing said enable signal and position signal to detect a direction and a distance of a movement of said marking operation of the user and controlling the image displayed on the display panel in accordance with said detected direction and distance of the movement of the marking operation to perform a desired functionality in a human interactive manner.

Although the present invention is not limited to an application to the human interactive type electronic whiteboard, such an application is particularly advantageous. In this human interactive type electronic whiteboard according to the invention, the display system comprises:
   an electronic whiteboard having a display panel on which at least one operation region is set;
   a pen-like member for indicating a point on said display panel;
   a detection means for detecting a contact condition of the pen-like member to said operation region in the display panel and coordinates of a contact point to generate contact signal and coordinate signal; and
   a control means for processing said contact signal and coordinate signal to producing an enable signal from said contact signal and a movement signal representing a direction and an amount of a movement of the pen-like member on the display panel from said coordinate signal, and changing an image displayed on said display panel in accordance with said enable signal and movement signal to perform a desired functionality in a human interactive manner.

In a first aspect of the invention, the scroll functionality is carried out by moving the image displayed on the display panel in a direction over a distance which is defined by the direction and amount of the movement represented by said movement signal.

In a preferable embodiment according to the first aspect of the invention, said detection means further detects a velocity of the movement of the pen-like member on the display panel, and said control means defines said distance over which the displayed image is to be moved by multiplying said distance represented by said movement signal by a coefficient which is determined in relation to said detected velocity of the movement. In this embodiment, the displayed image can be scrolled over a long distance by a small but fast displacement of the pen-like member on the display panel. Therefore, a portion of the displayed image hidden by the user can be made very small.

In a second aspect of the invention, the page up and down functionality is performed. In this case, the operation region is set to be identical with an area on which a text image such as a book is displayed. Further, only a horizontal or vertical component of the movement of the pen-like member is extracted and the page up or down is effected in dependence upon a sign or direction of the extracted horizontal component.

In a third aspect of the invention, a window displayed on the display panel is moved or shifted. In this case, a point within a predetermined region, e.g. a title bar area in the window is first pointed by the pen-like member, and then the pen-like member is moved or dragged on the display panel toward a desired area into which the window is to be shifted. Also in this window shift functionality, it is sufficient to drag the pen-like member over a small distance on the display panel, and therefore a portion of the displayed information hidden by the user during the window shift functionality can be made small.

According to a fourth aspect of the invention, a numerical value indicated by a counter displayed on the display panel can be incremented or decremented. In this case, a predetermined operation region near the counter is first pointed by the pen-like member, and then the pen-like member is dragged upward to increment the count value one by one or the pen-like member is dragged downward to decrement the count value one by one. Since the pen-like member is moved on the display panel during this count value changing functionality, the undesired affect of the user upon the displayed information is mitigated to some extent. Furthermore, the operation of the user becomes very easy as compared with the known count value changing operation. That is to say, in practice, it is difficult to tap or mark the same point repeatedly by the pen-like member.

Now an embodiment of the human interactive type display system according to the present invention will be explained further in detail with reference to the accompanied drawings. It should be noted that this embodiment is directed to the electronic whiteboard, but it is illustrated merely for the exemplary purpose and the scope of the present invention is not limited by this embodiment.

BRIEF DESCRIPTION OF THE DRAWINGS

FIG. 1 is a schematic view showing the scroll functionality in the known electronic whiteboard system;

FIG. 2 is a schematic view illustrating the page up and down functionality in the known electronic whiteboard system;

FIG. 3 is a schematic view representing the count value changing functionality in the known electronic whiteboard;

FIG. 4 is a block diagram depicting an embodiment of the electronic whiteboard according to the invention;

FIG. 6 is a flow chart explaining successive steps of the scroll functionality according to the invention;

FIGS. 7A–7C are schematic views illustrating the page up and down functionality according to the invention;

FIG. 8 is a flow chart representing successive steps in the page up and down functionality according to the invention;

FIG. 10 is a flow chart representing successive steps in the window shift functionality;

FIG. 11 is a schematic view showing the count value changing functionality according to the invention.

DESCRIPTION OF THE PREFERRED EMBODIMENTS

Figure 5A:
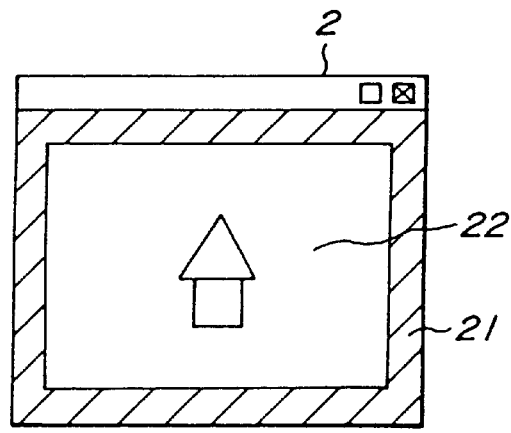
FIGS. 5A–5C are schematic views representing the scroll functionality according to the invention.

FIG. 4 is a block diagram illustrating an embodiment of the human interactive type display system according to the invention. In the present embodiment, the display system is realized as the human interactive type electronic whiteboard system. This electronic whiteboard system comprises a display panel formed by an electronic whiteboard in the form of a tablet, which is provided with a faculty for detecting a contact condition and coordinates of a contact point of a pen-like member 1 on the electronic whiteboard. For the sake of simplicity, the tablet type electronic whiteboard 2 and pen-like member 1 are also termed as whiteboard and pen, respectively. The electronic whiteboard system further comprises a projector 3 for optically projecting an image such as text data and numerical data onto the whiteboard 2, and a computer 4 for controlling the projector 3. In the present embodiment, the projector 3 is formed by a liquid crystal display type projector and is arranged in front of a display screen of the whiteboard.

The computer 4 comprises a pen coordinate input processing unit 41 which receives a signal supplied from the whiteboard 2 and produces a coordinate signal representing a position of a point marked by the pen 1 on the whiteboard, and a pen position storing unit 42 for storing the coordinate signal supplied from the pen coordinate input processing unit 41. After pointing a point on the whiteboard, when the pen 1 is moved or dragged on the whiteboard, a coordinate signal representing a current position of the pen 1 on the whiteboard 2 is successively stored in the pen position storing unit 42 during a movement of the pen on the whiteboard. In this case, the first coordinate signal denoting an initial contact point is stored as a start position of the pen on the whiteboard. It should be noted that this start position expresses a contact condition of the pen 1 on the whiteboard 2. The computer 4 furthermore includes an image display control unit 43 for selectively performing the scroll, page up and down, window shift and count value changing functionalities, a display data memory 44 for storing information to be displayed such as text date, image data and graphical data, and a display processing unit 45 for controlling the display on the projector 3.

In the present embodiment, the electronic whiteboard 2 is constructed as the tablet which can detect a contact condition of the pen 1 onto the whiteboard 2 and coordinates of a contact point by means of an electromagnetic coupling. However, according to the invention, any other conventional tablet of pressure sensitive or electrostatic or optical type may be used.

Now the scroll functionality according to the invention will be explained with reference to FIGS. 5 and 6. In the scroll functionality, a displayed image on the whiteboard 2 may be moved up and down as well as right and left. In the present embodiment, the displayed image may be scrolled not only in the up and down directions as well as in the right and left directions, but also in any oblique direction.

It is first assumed that on the whiteboard 2, there is displayed an image 22 by the projector 3 as shown in FIG. 5A. On the whiteboard 2, a scroll operation region 21 is set. This scroll operation region 21 may be displayed by means of the projector 3 under the control of the image display control unit 43 of the computer 4. In the present embodiment, the scroll operation region 21 is provided along the four sides of the whiteboard 2 as indicated by hatching.

Figure 5B:
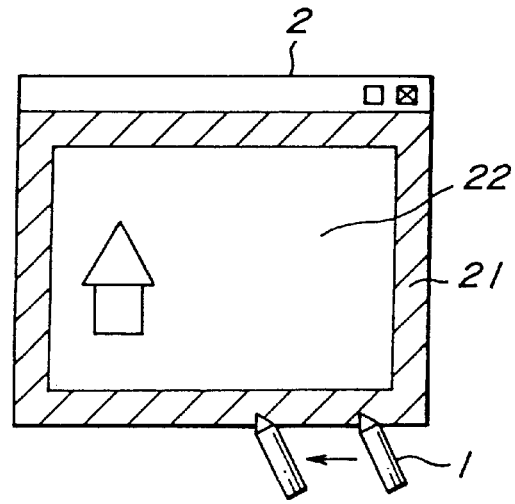
Figure 5C:
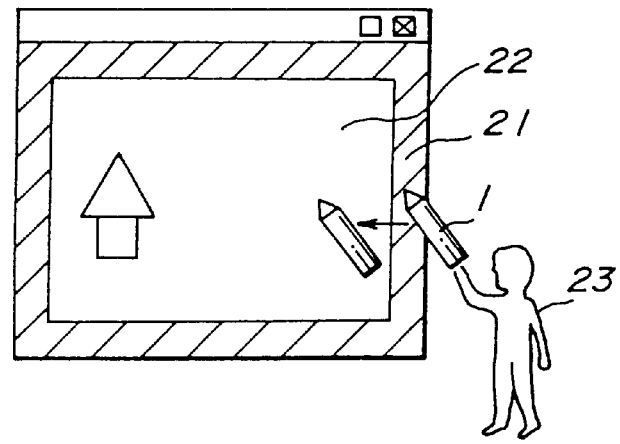

When the displayed image 22 is to be scrolled in the left-hand direction in FIG. 5A, at first a point within the scroll operation region 21 is pointed by the pen 1, and then the pen is moved or dragged in the left-hand direction as illustrated in FIG. 5B. In this case, any point within the scroll operation region 21 may be pointed by the pen 1. For instance, a point in the right-hand side of the scroll operation region 21 may be marked by the pen 1 as illustrated in FIG. 5C. In this case, when the pen 1 is moved leftward, a contact point leaves the scroll operation region 21 and comes into the information display region. However, as will be apparent from the later explanation, this does not cause any trouble, because a start point of the movement of the pen 1 is within the scroll operation region 21. Since the scroll operation region 21 is provided along the periphery of the whiteboard 2, a part of the displayed image 22 which is hidden by a user 23 or user's hand during the scroll operation becomes very small.

When a tip of the pen 1 is brought into contact with the whiteboard 2, the whiteboard generates the signal representing coordinates of a contact point, which are then supplied to the pen coordinate input processing unit 41 in the computer 4. In the pen coordinate input processing unit 41, it is judged whether or not the contact point denoted by the received coordinates is in the scroll operation region 21. When it is judged that the relevant contact point situates within the scroll operation region 21, the pen coordinate input processing unit 41 supplies an enable signal to the image display control unit 42. The image display control unit 43 responds to this enable signal and initiate a scroll control processing program shown in FIG. 6.

In the scroll control processing program, coordinates of the pen at the initial contact point are stored in the pen position storing unit 42 (step 31). Here, this coordinates are called previous coordinates ($x_{prev}$, $y_{prev}$). Then, in a step 32, it is judged whether or not the pen 1 is separated from the whiteboard 2. If NO, in a step 33, it is further checked whether or not the pen is moved or dragged on the whiteboard. During this movement of the pen 1, detected coordinates of the pen are stored in the pen position storing unit 42 in a step 34. The coordinates are called current coordinates ($x_{now}$, $y_{now}$) denoting a current position of the pen on the whiteboard. Then, in a step 35, a moving amount of the pen 1 is derived in the image display control unit 43 by performing a calculation of ($x_{now}-x_{prev}$, $y_{now}-y_{prev}$). Then, the thus calculated moving amount of the pen 1 is multiplied by a coefficient k to derive an actual amount of the movement of the displayed image 22 on the whiteboard 2 as [($x_{now}-x_{prev}$)×k, ($y_{now}-y_{prev}$)×k]. The thus calculated amount of movement [($x_{now}-x_{prev}$)×k, ($y_{now}-y_{prev}$)×k] is supplied to the display processing unit 45 to effect the scroll of the displayed image 22 into a desired direction over a desired distance. Finally, in a step 36, the coordinates of the current point ($x_{prev}$, $y_{prev}$) of the pen 1 are replaced by the newly detected coordinates ($x_{now}$, $y_{now}$). Then, the current coordinates ($x_{now}$, $y_{now}$) of the pen 1 are changed into the previous coordinates ($x_{prev}$, $y_{prev}$). After that, the process returns into the step 32 and the above mentioned process is carried out until the pen 1 is separated from the whiteboard 2. In this manner, the displayed image 22 can be directly moved into a desired position on the whiteboard 2.

In the scroll functionality according to the invention, once the pen 1 is brought into contact with the whiteboard 2 at any point within the predetermined scroll operation region 21, the pen is moved into a desired direction over a desired distance, the displayed image 22 may be scrolled in the same direction by a distance corresponding to the distance over which the pen have been moved. Therefore, the user 23 can initiate the scroll functionality by marking a point in an area of the scroll operation region 21 which is near the user, and thus the user or user's hand hardly hide the displayed image 22. Moreover, the distance over which the pen 1 is dragged on the whiteboard 2 is smaller than the distance over which the displayed image 22 is scrolled by the coefficient k, and therefore the movement of the user's hand can be made materially small.

In the present embodiment, the coefficient k is set to a constant value, but according to the invention, the value of k may be varied in accordance with a velocity of the dragging movement of the pen 1 on the whiteboard 2. That is to say, when the velocity of the movement of the pen 1 is high, the value of k is made large and when the velocity is low, the value of k is made small. Then, on one hand, the displayed image 22 may be moved over a long distance by moving the pen at a high speed, and on the other hand, the displayed image may be scrolled slowly and finely over a small distance by moving the pen slowly. It is apparent that the velocity of the dragging movement of the pen 1 may be simply detected by processing the start and current coordinates in the image display control unit 43.

Furthermore, according to the invention, the scroll operation is initiated by detecting the movement of the pen 1 on the whiteboard 2 after confirming the contact of the pen onto a point within the scroll operation region 21. Therefore, once the scroll operation is started, the pen 1 may be moved into the display area of the whiteboard 2. That is to say, even in the draw mode, a locus of the dragging movement of the pen 1 during the scroll functionality is not drawn on the whiteboard 2 even when the pen is moved into the display area. In this manner, according to the invention, the display area is effectively utilized for the scroll functionality, and thus the scroll operation region 21 having a relatively small width can be set on the whiteboard 2 and a large area of the whiteboard can be used as the display area.

Now the page up and down functionality according to the invention will be explained with reference to FIGS. 7 and 8. FIGS. 7A, 7B and 7C are schematic views representing the change in the displayed image during the page up functionality. That is to say, initially a page 46-1 having a character A and a page 46-2 having a character B of a book or notebook 46 are displayed side by side as illustrated in FIG. 7A. FIGS. 7B and 7C depict conditions in which a sheet having the pages 46-2 and 46-3 printed front and rear surface thereof is turned onto the page 46-1 and a new page 46-4 is just appearing. It should be noted that the pages 46-3 and 46-4 include characters C and D, respectively.

According to the invention, on the whiteboard 2, there is defined a page up and down operation region 47. In the present embodiment, the page up and down operation region 47 is set to have an area on which the book 46 is displayed. That is to say, the page up and down control region 47 is identical with the display area. It should be noted that when the book 46 is displayed in this manner, the image display control unit 43 in the computer 4 is selected into the page up and down functionality and the page up and down operation region 47 is automatically set to be identical with the whole display area.

At first, any point in the page up and down operation region 47 is pointed by the pen 1 as illustrated in FIG. 7B, and then the pen is dragged rightward. As shown in FIG. 7C, during the dragging movement of the pen 1, the pen may be moved out of the page up and down operation region 47 as depicted in FIG. 7C.

In the page up and down functionality, when a tip of the pen 1 is brought into contact with a point within the page up and down operation region 47 on the whiteboard 2, a contact signal and coordinates of the contact point are detected by the whiteboard and are supplied to the computer 4 from the whiteboard 2. When the pen coordinate processing input unit 41 receives the contact signal and coordinates of the contact point, it supplies the enable signal to the image display control unit 43. Then, the image display control unit 43 initiates the page up and down processing program as illustrated by a flow chart shown in FIG. 8.

In the page up and down functionality, when the pen 1 is brought into contact with a point within the page up and down operation region 47, an x coordinate ($x_{start}$) of the initial contact point of the pen 1 is stored in the pen position storing unit 42 (step 51). Next, in a step 52, it is judged whether or not the pen 1 is separated from the whiteboard 2. If the separation of the pen from the whiteboard is detected by this step, the process is ended. Contrary to this, if the separation of the pen from the whiteboard is not detected, a current x coordinate of the pen is stored as ($x_{now}$) in a step 53. Then, in a step 54, it is judged whether or not a difference between said x coordinates ($x_{now}$-$x_{start}$) is within a predetermined range from −h to +h. This h may be set to a sufficiently small value for compensating a small possible vibration of the user's hand.

If the above difference between the x coordinates ($x_{now}$-$x_{start}$) is larger than −h, but smaller than +h, the process is returned into the step 52 and waits the movement of the pen 1. It is assumed that in the present embodiment, the movement of the pen in the right-hand direction is positive and that in the left-hand direction is negative.

As a result of the judgement in the step 54, if the difference between the x coordinates ($x_{now}$-$x_{start}$) is found to be not less than h, it is once again judged in a step 55 whether the pen 1 is separated from the whiteboard 2 or not, and then it is further judged in a step 56 whether the pen is moved or not. When the movement of the pen 1 is detected, a current x coordinate of the pen is stored in the pen position storing unit 42 as ($x_{now}$) in a step 57.

Next, in a step 58, a difference between said x coordinates ($x_{now}$-$x_{start}$) is calculated and the left-hand leaf of the book 46 is turned in the right-hand direction by an amount equal to a product of said difference and a coefficient k (($x_{now}$-$x_{start}$)×k). This operation is repeated until the pen 1 is removed from the whiteboard 2.

In the step 55, when it is judged that the pen 1 is separated from the whiteboard 2, in a step 59 it is further judged whether or not the relevant leaf of the book has been turned more than halfway. If the leaf of the book has been turned more than halfway, the page turning operation is forcedly continued until the relevant leaf has been completely turned in a step 60. On the contrary, if the page turning is judged not to be effected halfway, the page turning operation is finished in a step 61 and the leaf of the book is returned into the original position.

In the above mentioned page up and down functionality according to the invention, like as the scroll functionality, the page turning operation is carried out in accordance with an amount which is equal to the x coordinate difference ($x_{now}$-$x_{start}$) multiplied by the coefficient k, the page turning operation can be performed by a very small movement of the pen 1 on the whiteboard 2, and therefore the displayed image is hardly hidden by the user 23 and the movement of the pen can be minimized during the page up and down operation.

Moreover, also in the page up and down functionality, the above mentioned coefficient k may be changed in accordance with the velocity of the movement of the pen 1 on the whiteboard 2. In this case, if it is required to turn a very large number of pages, the user may drag the pen at a high speed.

Next the window shift functionality according to the invention will be explained with reference to FIGS. 9 and 10.

Figure 9A:
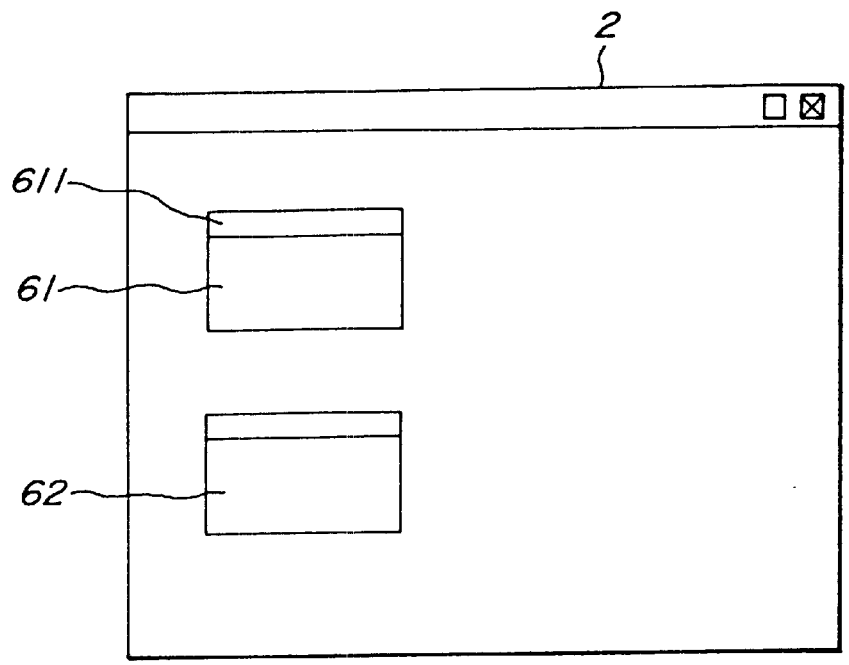
FIGS. 9A and 9B are schematic views showing the window shift functionality according to the invention.
Figure 9B:
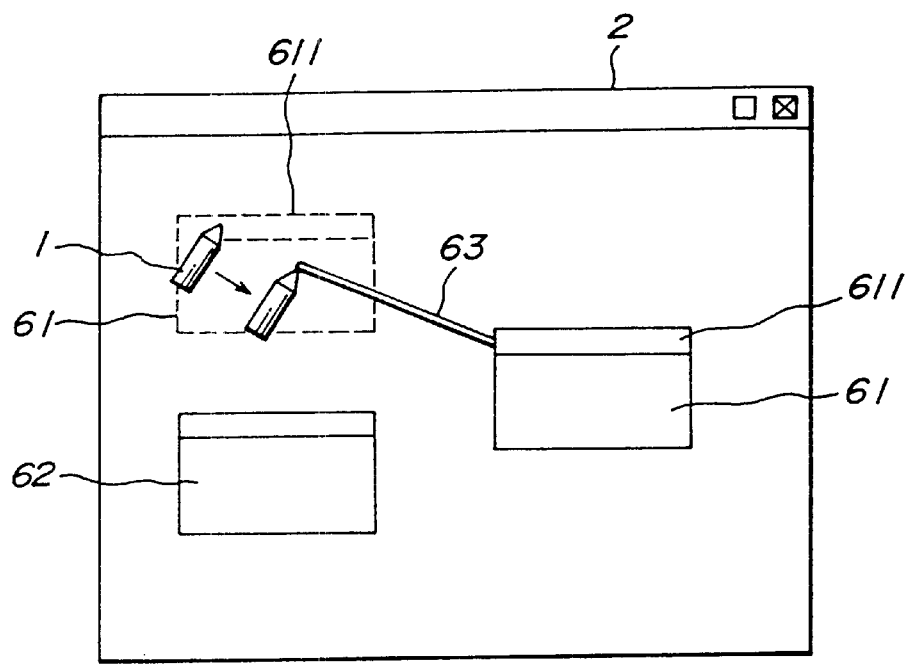

It is first assumed that on the whiteboard 2 there are displayed two windows 61 and 62 having given sizes as illustrated in FIG. 9A, and one window 61 is to be moved on the whiteboard. At first, any point within a predetermined title bar 611 of the relevant window 61 is pointed out by the pen 1 and then the pen is dragged into a given direction by a distance corresponding to a distance over which the window 61 is to be moved.

When the title bar 611 is pointed by the pen 1, a contact signal and coordinates of a contact point are supplied from the electronic whiteboard 2 to the computer 4. The contact signal and coordinates of contact point are received by the pen coordinate input processing unit 41, which then supplies an enable signal to the image display control unit 43. In response to this enable signal, the image display control unit 43 initiates the window shift control processing program whose flow chart is shown in FIG. 10.

In the window shift control processing program, when the pen 1 is brought into contact with the whiteboard 2 at a position within the title bar 611 of the window 61 and the enable signal is generated, coordinates of the contact point are stored in the pen position storing unit 42 as previous position coordinates ($x_{prev}$, $y_{prev}$) in a step 71. Then, it is checked whether or not the pen 1 is separated from the whiteboard 2 (step 72). If the pen 1 is separated from whiteboard 2, the process is ended. Contrary to this, when the pen is not separated from the whiteboard, it is further checked whether or not the pen 1 is moved on the whiteboard 2 (step 73). Only when the movement of the pen 1 is detected, coordinates of a pen contact position are stored in the pen position storing unit 43 as a current position coordinates ($x_{now}$, $y_{now}$) in a step 74.

Next, in a step 75, a variation in the coordinates of the pen 1, i.e. a distance over which the pen has been dragged on the whiteboard 2 is derived by effecting a calculation expressed by ($x_{now}$-$x_{prev}$, $y_{now}$-$y_{prev}$), then the thud calculated distance is multiplied by a coefficient k to derive a shift distance, and the window 61 is moved in accordance with the thus obtained shift distance. Like as the scroll functionality, the current position coordinates ($x_{now}$, $y_{now}$) are changed into the previous position coordinates ($x_{prev}$, $y_{prev}$) in a step 76. Then, the process returns into the step 72, and a similar operation is repeated.

In the present embodiment, during the movement of the window 61, there is also displayed a segment 63 which extends from the tip of pen 1 to a left upper corner of the window 61. It should be noted that since this segment 63 is always directed to the direction in which the pen 1 is dragged and the window 61 is moved, the user 23 can easily and clearly recognize a relationship between the dragging operation of the pen and the actual movement of the window on the whiteboard 2. Therefore, even if a relatively large number of windows are displayed on the whiteboard 2 simultaneously, the user can clearly recognize a window whose position on the whiteboard is to moved.

Also in the window shift functionality, a value of the coefficient k may be changed in accordance with a dragging velocity of the pen 1 on the whiteboard 2. Then, if the user wants to move a window over a relatively long distance, it is sufficient for the user to drag the pen 1 into a given direction at a high speed.

Now the counter value changing functionality according to the invention will be explained with reference to FIGS. 11 and 12.

In this mode of operation, on the whiteboard 2 there are displayed a counter 81 and a count operation region 82 adjacent to a right side of counter 81 as depicted in FIG. 11. If the counter 81 is displayed on the whiteboard 2 together with other images, it is usually convenient that the counter is displayed near a right side of the whiteboard 2. Then, the count operation region 82 may be displayed adjacent to the right side of the counter 81 as illustrated in FIG. 11. Then, a possibility that the user might hide the displayed image during the count change functionality can be minimized. On the count operation region 82, there are provided up and down marks, but according to the invention, the function of these marks are entirely different from that of the known up and down buttons 109a and 109b shown in FIG. 3. That is to say, in the known count change functionality, the user has to point one of the buttons with the pen continuously or repeatedly. However, according to the invention such a cumbersome and difficult operation is not required at all.

When a count value indicated in the counter 81 is to be incremented, at first any point within the count operation region 82 is pointed by the pen 1. Then, the pen 1 is dragged upward (shown by an upward arrow ⊕ in FIG. 11), while the tip of pen is kept to be contacted with the whiteboard 2. When a count value in the counter 81 is to be decremented, any point within the count operation region 82 is pointed by the pen 1, and then the pen is dragged downward (indicated by a down arrow ○).

Figure 12:
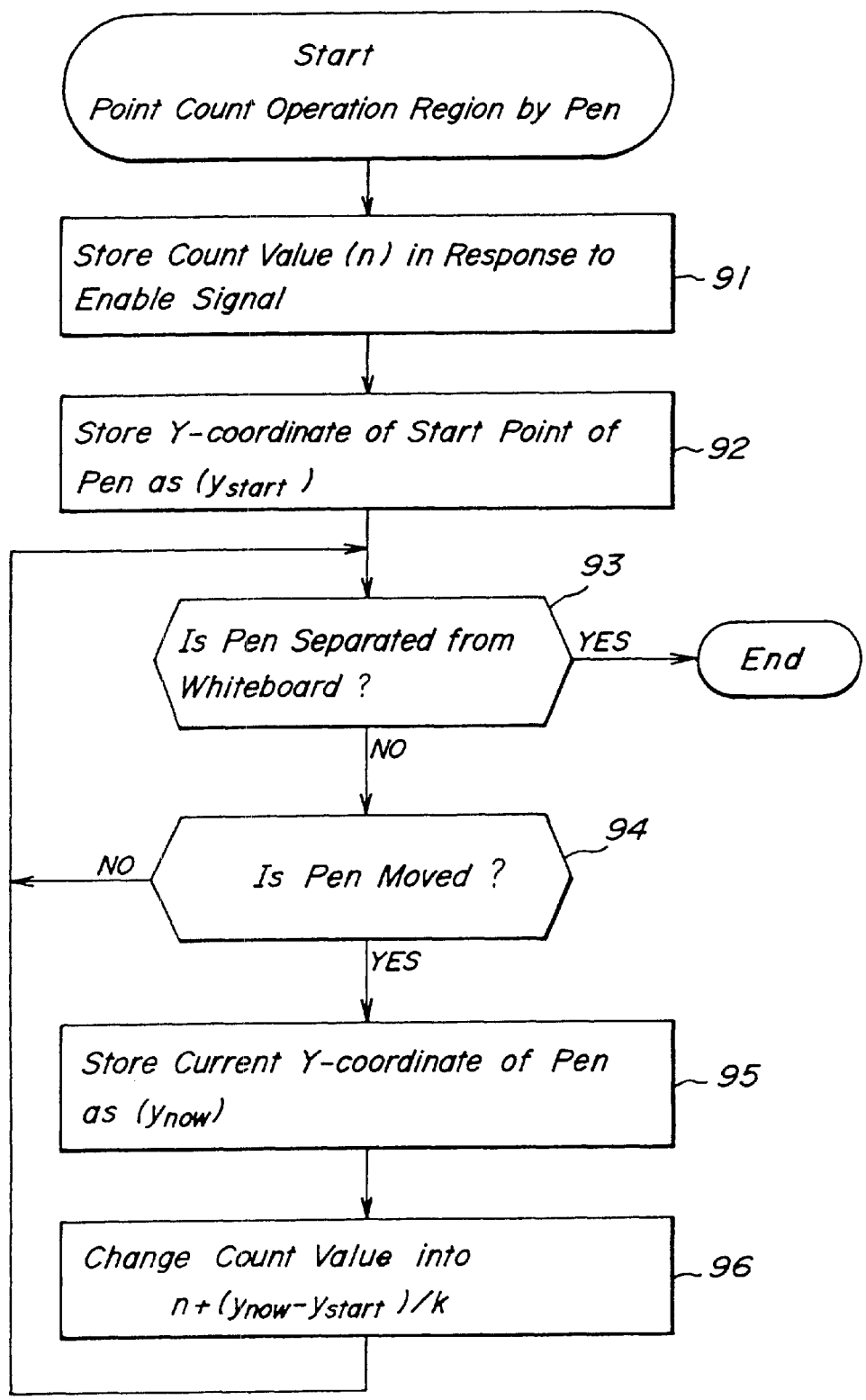
FIG. 12 is a flow chart representing successive steps in the numerical data changing functionality.

As explained above, when a point within the count operation region 82 is pointed by the pen 1, a contact signal is supplied from the electronic whiteboard 2 to the pen coordinate input processing unit 41 in the computer 4 and the count value changing control processing program is initiated as represented by a flow chart shown in FIG. 12.

In the count value changing program, at first, a count value displayed in the counter 81 at a time when an enable signal is generated in response to the contact signal is stored in the display data memory 44 as an initial count value n in a step 91. Next, an y coordinate of the pen contact point is stored in the pen position storing unit 42 as ($y_{start}$) in a step 92. In a next step 93, it is judged whether or not the pen 1 is separated from the count operation region 82. If the pen 1 is not separated from the whiteboard 2, then it is further judged whether or not the pen 1 is dragged in a step 94. When the pen 1 is dragged from the point within the count operation region 82, an y coordinate of a pen contact point is stored in the pen position storing unit 42 as a current pen position ($y_{now}$).

Next, in a step 96, a distance over which the pen 1 is dragged is calculated from ($y_{now}-y_{start}$). Then, the thus calculated distance is divided by a coefficient k to derive an incremented count value. In this calculation, a fraction should be neglected or a quotient should be rounded off into an integer number. The thus derived incremented count value is added to the initial count value n to derive a new count value, and this new count value is displayed on the counter 81. Also in this functionality, the initial count value is replaced by the new count value.

In the manner explained above, in the count value changing functionality according to the invention, after the pen is contacted with any point within the count operation region 82, the pen is dragged upward or downward, the count value displayed in the counter 81 can be incremented or decremented. Therefore, the count value can be changed by a much simpler operation than the known whiteboard system in which up or down button has to be pointed by the pen continuously or repeatedly.

It should be noted that the present invention is not limited to the embodiments explained above, but many modifications and alternations may be conceived by those skilled in the art within the scope of the invention. For instance, in the above embodiment, the display panel is formed by the electronic whiteboard in which the image is projected by the LCD projector onto the display screen from the front side thereof, but the image may be projected from the rear side of the display screen. Furthermore, according to the invention, the display panel may be constituted by any other image display device having a faculty of detecting a point denoted by a marker such as a LCD tablet. In this case, it is not always necessary to use the pen-like member as the marking means, but any other marker such as magnetic marker and optical marker may be equally used. In the magnetic marker and optical marker, it is not always necessary to bring the marker into contact with the display panel. Moreover, in the above embodiment, handwritten characters, marks and graphics entered with aid of the pen are recognized and are displayed on the whiteboard, but according to the invention such a recognition may be dispensed with.

As explained above in detail, in the human interactive type display system according to the invention, the user with the marking means such as pen denotes any point within the operation region such as the scroll operation region 21, page turning operation region 57, tool bar region 611 and count operation region 82 is point and then drags the marking means into a desired direction by a desired distance on the display panel. Then, the displayed image is scrolled in a desired direction over a desired distance, a desired number of pages of the displayed book are turned up or down, the window is shifted in a desired direction over a desired distance, and the count value in the displayed counter can be incremented or decremented by a desired count value. In this case, a part of the displayed image hidden by the user from observers can be minimized and a necessary moving distance of the user or user's hand can be reduced. Further, the dragging operation fits the natural feeling of the user and can avoid the minute operation which is difficult for the user standing in front of the display panel arranged in an upright posture.

What is claimed is:

1. A human interactive type image display system comprising:

a display means having a display panel on which an image is displayed, said display panel having a predetermined operation region;

a marking means for pointing a point on said display panel; and a controlling means for detecting a marking operation of a user by said marking means for a point within said operation region in the display panel to produce an enable signal and coordinates of points on the display panel pointed by said marking means successively from said point within the operation region to produce a position signal during a marking operation of the user, processing said enable signal and position signal to detect a direction and a distance of a movement of said marking operation of the user and controlling the image displayed on the display panel in accordance with said detected direction and distance of the movement of the marking operation to perform a desired functionality in a human interactive manner, wherein said display means comprises an electronic whiteboard, said marking means comprises a pen-like member which is brought into contact with a display panel of the electronic whiteboard for marking a point on said display panel, and said enable signal is generated by processing a contact signal representing a contact condition of the pen-like member to the point within said operation region in the display panel, said display system for performing a window shift functionality for shifting a window displayed on the display panel, wherein the window displayed on the display panel is shifted in a direction over a distance which are defined by the direction and amount of the movement of the pen-like member on the display panel during the marking operation of the user such that a position of said window after shifting is different from a position at which said pen-like member is penned up from the display panel and said distance over which said window is moved is larger than said distance over which said pen-like member is moved.

2. A display system according to claim 1, wherein said operation region is set to a tool bar of the window.

3. A display system according to claim 1, wherein said controlling means derives the direction and the distance of a window shift operation during the marking operation by effecting a calculation of $[(x_{now}-x_{prev}) \times k, (y_{now}-y_{prev}) \times k]$, where $x_{prev}$ and $y_{prev}$ are x and y coordinates of a start contact point, $x_{now}$ and $y_{now}$ are x and y coordinates of a current contact point and k is a coefficient.

4. A display system according to claim 1, wherein during the window shift operation, a segment is displayed on the display panel of the whiteboard, said segment connecting a tip of the pen-like member to a predetermined point of the window.

5. A display system according to claim 3, wherein said coefficient k is larger than 1.0.

6. A display system according to claim 3, wherein said operation region is set to a tool bar of the window.

7. A display system according to claim 2, wherein during the window shift operation, a segment is displayed on the display panel of the whiteboard, said segment connecting a tip of the pen-like member to a predetermined point of the window.

8. A display system according to claim 3, wherein during the window shift operation, a segment is displayed on the display panel of the whiteboard, said segment connecting a tip of the pen-like member to a predetermined point of the window.

9. A human interactive type image display system comprising:

a display means having a display panel on which an image is displayed, said display panel having a predetermined operation region;

a marking means for pointing a point on said display panel; and a controlling means for detecting a marking operation of a user by said marking means for a point within said operation region in the display panel to produce an enable signal and coordinates of points on the display panel pointed by said marking means successively from said point within the operation region to produce a position signal during a marking operation of the user, processing said enable signal and position signal to detect a direction and a distance of a movement of said marking operation of the user and controlling the image displayed on the display panel in accordance with said detected direction and distance of the movement of the marking operation to perform a desired functionality in a human interactive manner, wherein said display means comprises an electronic whiteboard, said marking means comprises a pen-like member which is brought into contact with a display panel of the electronic whiteboard for marking a point on said display panel, and said enable signal is generated by processing a contact signal representing a contact condition of the pen-like member to the point within said operation region in the display panel, said display system for performing a window shift functionality for shifting a window displayed on the display panel, wherein the window displayed on the display panel is shifted in a direction over a distance which are defined by the direction and amount of the movement of the pen-like member on the display panel during the marking operation of the user, wherein said controlling means derives the direction and the distance of a window shift operation during the marking operation by effecting a calculation of $[(x_{now}-x_{prev}) \times k, (y_{now}-y_{prev}) \times k]$, where $x_{prev}$ and $y_{prev}$ are x and y coordinates of a start contact point, $x_{now}$ and $y_{now}$ are x and y coordinates of a current contact point and k is a coefficient and said controlling means detects a velocity of the movement of the pen-like member and said coefficient k is changed in proportion to the decreased velocity.

* * * * *